US007578922B2

(12) United States Patent
Nakagiri

(10) Patent No.: US 7,578,922 B2
(45) Date of Patent: Aug. 25, 2009

(54) METHOD FOR PRODUCING HYDROGEN BY CHEMICAL PROCESS USING HEAT WITH ELECTRICITY

(75) Inventor: Toshio Nakagiri, Higashi-Ibaraki-gun (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 579 days.

(21) Appl. No.: 10/655,131

(22) Filed: Sep. 5, 2003

(65) Prior Publication Data
US 2005/0077187 A1    Apr. 14, 2005

(30) Foreign Application Priority Data
Jan. 30, 2003    (JP)    ............................. 2003-022580

(51) Int. Cl.
*C25B 1/00*    (2006.01)
(52) U.S. Cl. ...................................... 205/554; 205/637
(58) Field of Classification Search ................ 205/554, 205/637; 204/252, 265
See application file for complete search history.

(56) References Cited

U.S. PATENT DOCUMENTS

| 4,059,496 | A | * | 11/1977 | Schulten et al. | ............. | 205/554 |
| 4,330,378 | A | * | 5/1982 | Boltersdorf et al. | ......... | 205/554 |
| 4,391,682 | A | * | 7/1983 | Struck et al. | ................ | 205/554 |
| 4,412,895 | A | * | 11/1983 | Lu | .............................. | 205/637 |
| 4,613,416 | A | * | 9/1986 | Kau et al. | ................... | 205/510 |
| 4,643,806 | A | * | 2/1987 | Hegedus et al. | ............. | 205/455 |
| 5,458,744 | A | * | 10/1995 | Robinson et al. | ............ | 205/554 |
| 6,833,631 | B2 | * | 12/2004 | Van Breems | ................. | 290/42 |

OTHER PUBLICATIONS

Brown et al. High Efficiency Generation of Hydrogen Fuels Using Nuclear Energy, May 2002. ANuclear Energy Research Initiative (NERI) Project for the U.S. Department of Energy pp. 1-22.*
Argonne National Labratory website no date provided. http://www.cmt.anl.gov/Science_and_Technology/Fuel_Cells/Nuclear_Hydrogen_Production.shtml.*
My chemistry teacher website no date provided. http://www.mychemistryteacher.com/pdf/Honor%20Class/Chapter%208%20notes.pdf.*
Yoshio Kanai, "Nuclear Viewpoints (Genshiryoku eye)", vol. 49, pp. 26-29, Jan. 1, 2003.
IAEA-TECDOC-1085: "Hydrogen as an energy carrier and its production by nuclear power", Appendix A: Thermochemical cycles for hydrogen production, pp. 325-333, Apr. 2001.
W. Weirich et al., "Thermochemical Processes for Water Splitting—Status and Outlook", Nuclear Engineering and Design, vol. 78, pp. 285-291, 1984.
P. W. T. Lu et al., "Development status of electrolysis technology for the sulfur cycle hydrogen production process", Proc. 3rd World Hydrogen Energy Conference, Tokyo, Japan, vol. 1, pp. 439-461, Jun. 1980.

* cited by examiner

*Primary Examiner*—Arun S Phasge
(74) *Attorney, Agent, or Firm*—Wenderoth, Lind & Ponack, L.L.P.

(57) ABSTRACT

There is provided a method for thermochemically producing hydrogen from water by using sulfuric acid as a kind of reactant, combining a plurality of chemical reactions inclusive of sulfuric acid decomposition reaction and circulating reactants. The sulfuric acid decomposition reaction is carried out at a temperature of 600° C. or less by electrolysis using a partition wall of oxygen ion-permeable solid electrolyte and oxygen is separated simultaneously with the electrolysis to thereby carry out the method for producing hydrogen by chemical process using heat with electricity.

6 Claims, 2 Drawing Sheets

METHOD FOR PRODUCING HYDROGEN BY CHEMICAL PROCESS USING HEAT WITH ELECTRICITY

BACKGROUND OF THE INVENTION

The present invention relates to a method for thermochemically producing hydrogen from water by using sulfuric acid as a kind of reactant or reaction material, combining a plurality of chemical reactions inclusive of sulfuric acid decomposition reaction and circulating reactants. Particularly, the present invention relates to a method for producing hydrogen by chemical process using heat with electricity wherein sulfuric acid decomposition reaction is carried out at a temperature of 600° C. or less by electrolysis using a partition wall of oxygen ion-permeable solid electrolyte and oxygen is separated simultaneously with the electrolysis.

Method for producing hydrogen as an energy source includes a thermochemical hydrogen production method, as well as methane steam reforming process, electrolysis and the like. The thermochemical hydrogen production method is a method wherein a plurality of chemical reactions are combined to thermally decomposing water into hydrogen and oxygen, and heretofore more than 2000-3000 processes have been proposed for this method. Among them, there is a method for thermochemically producing hydrogen from water by using sulfuric acid as a kind of reactant, combining a plurality of chemical reactions inclusive of sulfuric acid decomposition reaction and circulating reactants.

As a representative example of conventional method, there is a thermochemical IS (iodine-sulfur) process. In this process, three chemical reactions, namely sulfuric acid decomposition reaction, Bunsen's reaction and hydrogen iodide decomposition reaction, are combined and water is decomposed into hydrogen and oxygen. These three chemical reactions differ in their reaction temperatures: the reaction temperature of the sulfuric acid decomposition reaction is around 850° C.; the reaction temperature of the Bunsen's reaction is around 100° C. or less; and the reaction temperature of the hydrogen iodide decomposition reaction is around 400° C. by using catalyst. This process is different from the methane steam reforming process in generating no carbon dioxide, and has higher heat utilization efficiency in contrast to electrolysis, thus is effective in conservation of resources and environment. Therefore, investigations are now being zealously pushed forward for this process.

As described above, the conventional thermochemical IS process necessitates high temperature of around 850° C. in sulfuric acid decomposition. Thus there is a problem that a special energy source such as a high temperature gas furnace is required in industrial execution. In addition, since sulfuric acid having high reactivity in high temperature is used, anti-corrosion characteristic of materials becomes a big problem.

Among other thermochemical hydrogen production methods using sulfuric acid, there is a so-called "Westinghouse Process" in which iodine is not used and electricity is simultaneously used in sulfuric acid formation reaction. However, the same problem as described above arises because the sulfuric acid decomposition reaction is carried out only by means of heat.

SUMMARY OF THE INVENTION

An object of the present invention is to provide a method for producing hydrogen from water by chemical process using heat with electricity, which makes the temperature of the whole process lower and thus the various energy sources usable, and which is capable of considerably decreasing corrosion of materials and improving energy utilization efficiency.

According to the present invention, there is provided a method for thermochemically producing hydrogen from water by using sulfuric acid as a kind of reactant, combining a plurality of chemical reactions inclusive of sulfuric acid decomposition reaction and circulating reactants, wherein said sulfuric acid decomposition reaction is carried out at a temperature of 600° C. or less by electrolysis using a partition wall of oxygen ion-permeable solid electrolyte and oxygen is separated simultaneously with the electrolysis to thereby carry out said method for producing hydrogen by chemical process using heat with electricity.

As one of the method for thermochemically producing hydrogen from water, there is a process in which sulfuric acid formation reaction forming hydrogen and sulfuric acid from sulfur dioxide and water is combined with the sulfuric acid decomposition reaction forming water, sulfur dioxide and oxygen by decomposing sulfuric acid.

As another method for thermochemically producing hydrogen from water, there is an iodine-sulfur process in which Bunsen's reaction forming sulfuric acid from sulfur dioxide, iodine and water is combined with hydrogen iodide decomposition reaction forming hydrogen and iodine by decomposing hydrogen iodide and the sulfuric acid decomposition reaction forming water, sulfur dioxide and oxygen by decomposing sulfuric acid.

In these methods, the sulfuric acid decomposition reaction comprises a step for vaporizing sulfuric acid to decompose sulfuric acid into sulfur trioxide and water and a step for decomposing sulfur trioxide into sulfur dioxide and oxygen, and electrolysis is used in the step for decomposing sulfur trioxide.

The solid electrolyte is preferably made of oxygen ion-permeable ceramics selected from yttria-stabilized zirconia, scandia-stabilized zirconia or cerium dioxide series ceramics, and the surface of said partition wall is preferably coated with an electrode made of a corrosion-resistant metal.

As an example of a preferable energy source in the present invention, a fast reactor may be used. Namely, a fast reactor plant co-generating hydrogen and electrical power using the method for thermochemically producing hydrogen from water according to the present invention is constructed by incorporating an electrolytic apparatus for the sulfuric acid decomposition reaction in a secondary cooling system of a fast reactor, and carrying out the sulfuric acid decomposition reaction by using heat from a secondary coolant in the secondary cooling system and electrical power generated by steam from a steam generator of the fast reactor.

The secondary sodium coolant of the fast reactor has a temperature around 500° C., which is suitable for the sulfuric acid decomposition reaction in the present invention. In addition, electrical power generated by driving a turbine with steam from the steam generator of the fast reactor can partially be utilized for electrolysis, and the rest of electrical power can be supplied for the external use. The thus constructed plant co-generating hydrogen and electrical power has an advantage that it can easily respond to daily load change in the plant.

PREFERRED EMBODIMENTS OF THE INVENTION

In the IS process, hydrogen and oxygen are chemically produced from water by combining the following three reaction formulas.

$$I_2 + SO_2 + 2H_2O \rightarrow 2HI + H_2SO_4 \; (<100°\text{C.}) \tag{1}$$

$$2HI \rightarrow H_2 + I_2 \; (400°\text{C. when catalyst is used}) \tag{2}$$

$$H_2SO_4 \rightarrow H_2O + SO_2 + \tfrac{1}{2}O_2 \tag{3}$$

The reaction shown by formula (3) is furthermore divided into the following two reactions (sulfuric acid vaporization step and sulfur trioxide decomposition step).

$$H_2SO_4 \rightarrow H_2O + SO_3 \; (300°\text{C.}) \tag{3a}$$

$$SO_3 \rightarrow SO_2 + \tfrac{1}{2}O_2 \; (\text{about } 800°\text{C.}) \tag{3b}$$

In the method called "Westinghouse Process", hydrogen and oxygen are electrochemically and thermochemically produced from water by combining the following two reaction formulas.

$$2H_2O + SO_2 \rightarrow H_2SO_4 + H_2 - \text{electricity} \; (<100°\text{C.}: 0.17\text{V}) \tag{4}$$

$$H_2SO_4 \rightarrow H_2O + SO_2 + \tfrac{1}{2}O_2 \tag{3}$$

Similar to the above-described method, the reaction shown by formula (3) is furthermore divided into the following two reactions.

$$H_2SO_4 \rightarrow H_2O + SO_3 \; (300°\text{C.}) \tag{3a}$$

$$SO_3 \rightarrow SO_2 + \tfrac{1}{2}O_2 \; (\text{about } 800°\text{C.}) \tag{3b}$$

In the above-described two processes, it is the sulfuric acid decomposition reaction (3), especially the sulfur trioxide decomposition step (3b), that requires high temperature. Therefore, in view of the most importance of "lowering the temperature" of this step in the present invention, electrolysis is applied to the sulfur trioxide decomposition step (3b) to employ heat in combination with electricity. Thereby, the whole process becomes operable at a lowered temperature (600° C. or less, or 400-500° C. or less dependent upon electrolysis condition), and lowered consumption of electrical power due to effective heat utilization is accomplished.

Figure 1:
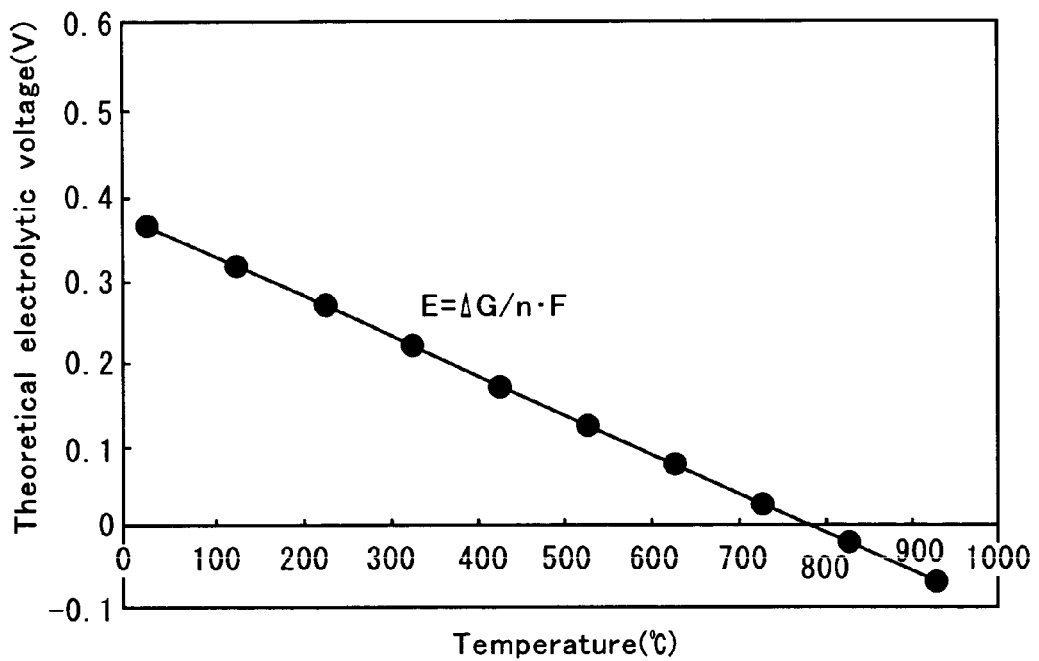
FIG. 1 shows a graph representing the relation between theoretical electrolytic voltage of $SO_3$ and temperature.

FIG. 1 shows temperature dependence of theoretical electrolytic voltage of $SO_3$. In FIG. 1, the theoretical electrolysis voltages (ordinate axis) for a temperature (abscissa axis) are plotted, when heat is supplied from the outside ($E = \Delta G/n \cdot F$). Here, $\Delta G$: Gibbs energy change, n: number of electron (=2) participating in the reaction and F: Faraday constant. It is understood from FIG. 1 that $SO_3$ can theoretically be decomposed by controlling the heating temperature within a predetermined range of around 600-400° C. when electrolytic voltage is set at 0.1-0.2V, for example. Incidentally, when $SO_3$ is decomposed using electricity solely, electrolytic voltage of 0.5V or more is required.

In addition, according to the method of the present invention in which the lowered process temperature is intended based on the above-described "Westinghouse Process", corrosion of materials is reduced due to no use of iodine and further simplification of process equipment, along with the lowered temperature of the whole process, is obtained.

Figure 2:
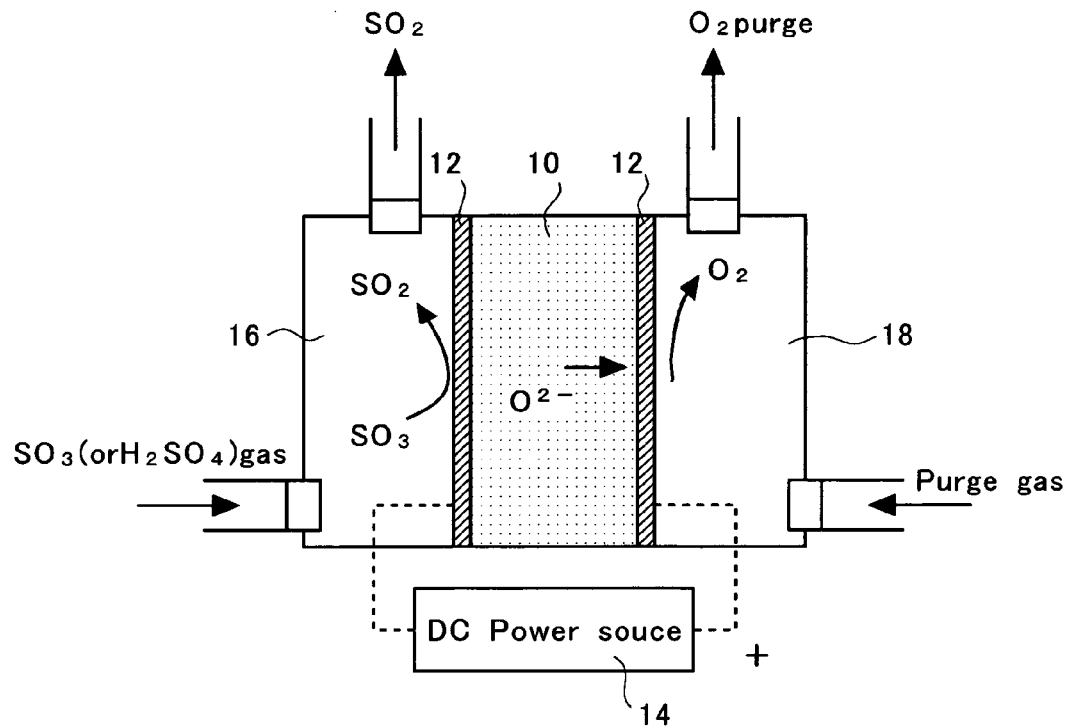
FIG. 2 shows a principle of sulfur trioxide decomposition step.

In the present invention, the sulfur trioxide decomposition process as shown in formula (3b) is theoretically carried out by electrolysis using a solid electrolyte 10 as shown in FIG. 2. The interior of an electrolytic apparatus is partitioned into two chambers 16 and 18 by a partition wall of the solid electrolyte 10 permeable to oxygen ion made of yttria-stabilized zirconia or the like, and electrodes 12 are formed on the surface of the solid electrolyte 10. In order to accommodate corrosiveness of $SO_3$, a platinum (Pt) coated membrane having corrosion resistance is used as the electrodes 12. While controlling the temperature inside the electrolytic apparatus to the predetermined temperature of 600° C. or less, DC power (less than 0.2V) is applied between the opposed electrodes 12 from DC power source 14. $SO_3$ (or $H_2SO_4$) gas is supplied in the chamber 16 and purge gas is supplied in the other chamber 18. $SO_2$ is discharged from the chamber 16 due to the decomposition of $SO_3$ by heat in combination with electricity, while $O^{2-}$ permeates through the solid electrolyte 10 and discharged from the other chamber 18 in the form of $O_2$ gas. Thus, electrolysis can be conducted at a low temperature of 600° C. or less with a reduced electrical power. Furthermore, oxygen can be separated simultaneously with electrolysis and recovered. As the oxygen ion-permeable solid electrolyte, scandia-stabilized zirconia, cerium dioxide series ceramics or the like may also be used. As the electrode, palladium (Pd) or the like may also be used.

EXAMPLES

Figure 3:
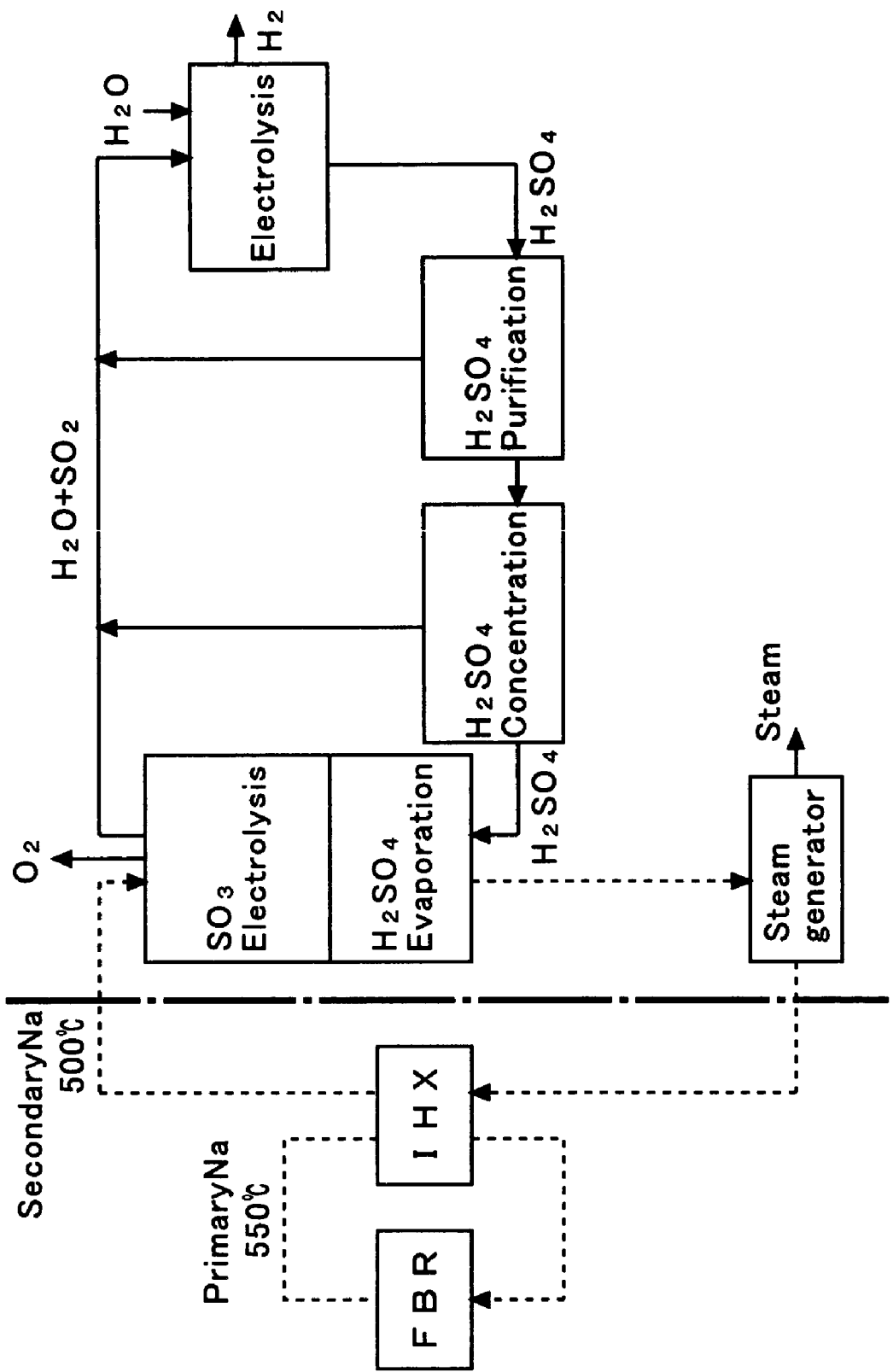
FIG. 3 shows an example of a simplified process according to the present invention using a fast breeder reactor.

FIG. 3 shows an example of plant carrying out the lowered temperature process according to the invention. Basically, the method of the present invention can be constituted only by the electrolysis at two positions (sulfuric acid decomposition reaction and sulfuric acid formation reaction) and sulfuric acid purification-sulfuric acid concentration step. Here, a fast breeder reactor (FBR) is assumed as an energy source. The heat in a reactor core of the fast breeder reactor is conveyed by a primary sodium coolant (about 550° C.) to an intermediate heat exchanger (IHX) where heat exchanged with a secondary sodium coolant is carried out. The temperature of the secondary sodium coolant is around 500° C., and this heat is used for heating on the occasion of $SO_3$ electrolysis and for sulfuric acid evaporation. Namely, an electrolytic apparatus for the sulfuric acid decomposition reaction is incorporated in the secondary sodium cooling system. Further, the secondary sodium coolant is heat exchanged with water in a steam generator to thereby generate steam. This steam turns and drives a steam turbine to thereby generate electrical power, as usual. The electrical power thus generated is partially supplied to the electrolytic apparatus for the sulfuric acid decomposition reaction and is used for electrolysis of $SO_3$.

In the $SO_3$ decomposition reaction step, $SO_2$ is produced and $O_2$ is simultaneously separated and recovered. In the sulfuric acid formation reaction step, $H_2SO_4$ is formed from $H_2O$ and $SO_2$, and $H_2$ is simultaneously produced. The thus formed $H_2SO_4$ is purified in the sulfuric acid purification step, concentrated in the sulfuric acid concentration step and is supplied to the sulfuric acid vaporization step. $SO_2$ and $H_2O$ generated in the sulfuric acid purification step or in the sulfuric acid concentration step are fed back to the sulfuric acid formation reaction step. Under such a plant constitution, the practical electrolytic voltage is 0.5V or less at the two positions, and thus about ½ of electrical power is required when compared with the normal water electrolysis (about 2V).

In practicing the present invention, the energy source is optionally selected. However, by simultaneously utilizing the heat of around 500° C. and the electricity produced in the above-described fast breeder reactor, the present invention makes it possible both to efficiently produce hydrogen and to construct the plant co-generating hydrogen and electrical power. The co-generation plant for hydrogen and electrical power can accommodate daily load change in power demand supply by adjusting the production ratio of hydrogen and electrical power, while keeping the reactor output at the predetermined level.

The advantageous effects of the present invention are described below.

The conventional thermochemical hydrogen producing method required temperature of 800° C. or more in the sulfuric acid decomposition reaction. According to the present invention, however, the whole process can be carried out at the lowered temperature of 600° C. or less, because the invention is, as described above, a method for producing hydrogen by chemical process using heat with electricity and uses the partition wall of oxygen ion-permeable solid electrolyte. As a result, the demand for the use of the corrosion resistant materials is largely relaxed.

The conventional electrolysis of water theoretically required the electrolytic voltage of about 1V at a temperature of 400-500° C. However, in the present invention, the electrolytic voltage is theoretically reduced to about 0.4V, namely to the extent of about ½ when applied to the Westinghouse Process, and theoretically redued to about 0.2V, namely to the extent of about ⅕ when applied to the IS process.

Furthermore, in the conventional thermochemical hydrogen producing method, besides the sulfuric acid decomposition reaction step, the step for separating oxygen gas generated by decomposition was necessary. In the present invention, however, the decomposition of sulfuric acid (or $SO_3$) and the separation of oxygen gas can be carried out simultaneously, and thus the energy loss decreases.

What is claimed is:

1. A method for producing hydrogen from water which comprises the steps of producing sulfuric acid and hydrogen from water and sulfur dioxide, and decomposing sulfuric acid to produce water, sulfur dioxide and oxygen, reactants in the respective steps being circulated, wherein said sulfuric acid decomposition comprises a step for vaporizing sulfuric acid to decompose sulfuric acid into sulfur trioxide and water and a step for decomposing sulfur trioxide into sulfur dioxide and oxygen, and wherein the step for decomposing sulfur trioxide is carried out at a temperature of 600° C. or less by electrolysis using a partition wall of oxygen ion-permeable solid electrolyte and oxygen is separated simultaneously with the electrolysis to thereby produce hydrogen by chemical process, and water using heat with electricity.

2. The method for producing hydrogen from water according to claim 1, wherein the step for producing sulfuric acid and hydrogen comprises electrolyzing water and sulfur dioxide.

3. The method for producing hydrogen from water according to claim 2, wherein said solid electrolyte is made of oxygen ion-permeable ceramics selected from the group consisting of yttria-stabilized zirconia, scandia-stabilized zirconia and cerium dioxide series ceramics, and the surface of said partition wall is coated with an electrode made of a corrosion-resistant metal.

4. The method for producing hydrogen from water according to claim 1, wherein the step for producing sulfuric acid and hydrogen comprises forming sulfuric acid and hydrogen iodide by Bunsen's reaction from sulfur dioxide, iodine and water, and decomposing hydrogen iodide to form hydrogen and iodine.

5. The method for producing hydrogen from water according to claim 4, wherein said solid electrolyte is made of oxygen ion-permeable ceramics selected from the group consisting of yttria-stabilized zirconia, scandia-stabilized zirconia and cerium dioxide series ceramics, and the surface of said partition wall is coated with an electrode made of a corrosion-resistant metal.

6. The method for producing hydrogen from water according to claim 1, wherein said solid electrolyte is made of oxygen ion-permeable ceramics selected from the group consisting of yttria-stabilized zirconia, scandia-stabilized zirconia and cerium dioxide series ceramics, and the surface of said partition wall is coated with an electrode made of a corrosion-resistant metal.

* * * * *